United States Patent
Pang

(10) Patent No.: US 11,922,725 B2
(45) Date of Patent: Mar. 5, 2024

(54) METHOD AND DEVICE FOR GENERATING EMOTICON, AND STORAGE MEDIUM

(71) Applicant: BEIJING XIAOMI PINECONE ELECTRONICS CO., LTD., Beijing (CN)

(72) Inventor: Yunping Pang, Beijing (CN)

(73) Assignee: BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 48 days.

(21) Appl. No.: 17/486,622

(22) Filed: Sep. 27, 2021

(65) Prior Publication Data

US 2022/0269880 A1     Aug. 25, 2022

(30) Foreign Application Priority Data

Feb. 20, 2021   (CN) .......................... 202110193597.6

(51) Int. Cl.
     *G06V 40/16*      (2022.01)
     *G06F 40/279*      (2020.01)
     *G06V 10/20*      (2022.01)
     *G06V 20/62*      (2022.01)

(52) U.S. Cl.
     CPC .......... *G06V 40/175* (2022.01); *G06F 40/279* (2020.01); *G06V 10/255* (2022.01); *G06V 20/635* (2022.01)

(58) Field of Classification Search
     CPC .. G06V 40/175; G06V 20/635; G06V 10/255; G06V 10/82; G06V 40/174; G06F 40/279
     See application file for complete search history.

(56) References Cited

U.S. PATENT DOCUMENTS

| | | | |
|---|---|---|---|
| 2014/0063236 A1 | 3/2014 | Shreve et al. | |
| 2017/0098122 A1* | 4/2017 | el Kaliouby | ......... G06V 40/171 |
| 2017/0185826 A1 | 6/2017 | Shreve et al. | |
| 2017/0319123 A1 | 11/2017 | Voss et al. | |

(Continued)

FOREIGN PATENT DOCUMENTS

| | | |
|---|---|---|
| CN | 104063683 A | 9/2014 |
| CN | 107369196 A | 11/2017 |

(Continued)

OTHER PUBLICATIONS

European Search Report in the European Application No. 21199396.9, dated Apr. 5, 2022, (11p).

(Continued)

*Primary Examiner* — Syed Haider
(74) *Attorney, Agent, or Firm* — Arch & Lake LLP

(57) ABSTRACT

A method and a device for generating an emoticon are provided. A first expression tag list corresponding to a face image in a portrait is acquired by inputting the face image into an expression recognition model. Additionally, at least one label text corresponding to the face image is determined based on the first expression tag list and a correspondence between a preset text and a second expression tag list. Furthermore, an expression image corresponding to the portrait is determined, where the face image is a part of the expression image. Moreover, an emoticon is generated by labelling the expression image with the at least one label text.

16 Claims, 5 Drawing Sheets

(56) References Cited

U.S. PATENT DOCUMENTS

| | | | |
|---|---|---|---|
| 2019/0205627 A1* | 7/2019 | De la Torre | G06V 40/172 |
| 2021/0022657 A1 | 1/2021 | Voss et al. | |
| 2022/0319233 A1* | 10/2022 | Wu | G06V 10/454 |

FOREIGN PATENT DOCUMENTS

| | | | |
|---|---|---|---|
| CN | 108280166 A | | 7/2018 |
| CN | 110458916 A | | 11/2019 |
| CN | 110706312 A | | 1/2020 |
| CN | 111882625 A | | 11/2020 |
| CN | 112036247 A | | 12/2020 |
| WO | 2021004114 A1 | | 1/2021 |

OTHER PUBLICATIONS

Zhang Liyuan et al., "Facial expressions output of network emotion recognition based on convolutional neural network", Journal of YuZhang Normal University No. 6, Dec. 30, 2019, pp. 124-128. 5 pages with English abstract.

First Office Action of the Chinese application No. 202110193597.6, dated Nov. 27, 2023. 17 pages with English translation.

\* cited by examiner

METHOD AND DEVICE FOR GENERATING EMOTICON, AND STORAGE MEDIUM

CROSS-REFERENCE TO RELATED APPLICATIONS

This application is based upon and claims priority to Chinese Patent Application No. 202110193597.6 filed on Feb. 20, 2021, the disclosure of which are incorporated herein by reference in its entirety for all purposes.

TECHNICAL FIELD

The present disclosure relates to the field of image processing, and more particularly, to a method and device for generating an emoticon, and a storage medium.

BACKGROUND

Emoticon is a common means of social communication, which may vividly convey content to be communicated via an image or a combination of an image and text, implementing better expression of emotion. Types of emoticons used by users in different groups in social communication differ a lot. For example, emoticons used among colleagues, friends, or family members differ significantly in style.

SUMMARY

The present disclosure provides a method and device for generating an emoticon, and a storage medium.

According to a first aspect of the present disclosure, there is provided a method for generating an emoticon. The method includes:

acquiring a first expression tag list corresponding to a face image in a portrait by inputting the face image into an expression recognition model;

determining at least one label text corresponding to the face image based on the first expression tag list and a correspondence between a preset text and a second expression tag list, where the at least one label text is configured to indicate content conveyed by a facial expression in the face image;

determining an expression image corresponding to the portrait, where the face image is a part of the expression image; and generating an emoticon by labelling the expression image with the at least one label text.

According to a second aspect of the present disclosure, there is provided a device for generating an emoticon. The device include at least: a processor; and a memory configured to store processor executable instructions.

The processor is configured to implement any method according to the first aspect when executing the executable instructions stored in the memory.

According to a third aspect of the present disclosure, there is provided a non-transitory computer-readable storage medium storing computer-executable instructions which, when executed by a processor, implement any method according to the first aspect here.

It should be understood that the general description above and the detailed description below are illustrative and explanatory, and do not limit the present disclosure.

BRIEF DESCRIPTION OF THE DRAWINGS

The accompanying drawings, which are incorporated in and form a part of this specification, illustrate embodiments consistent with the present disclosure and, together with the description, serve to explain the principles of the present disclosure.

DETAILED DESCRIPTION

Figure 1:
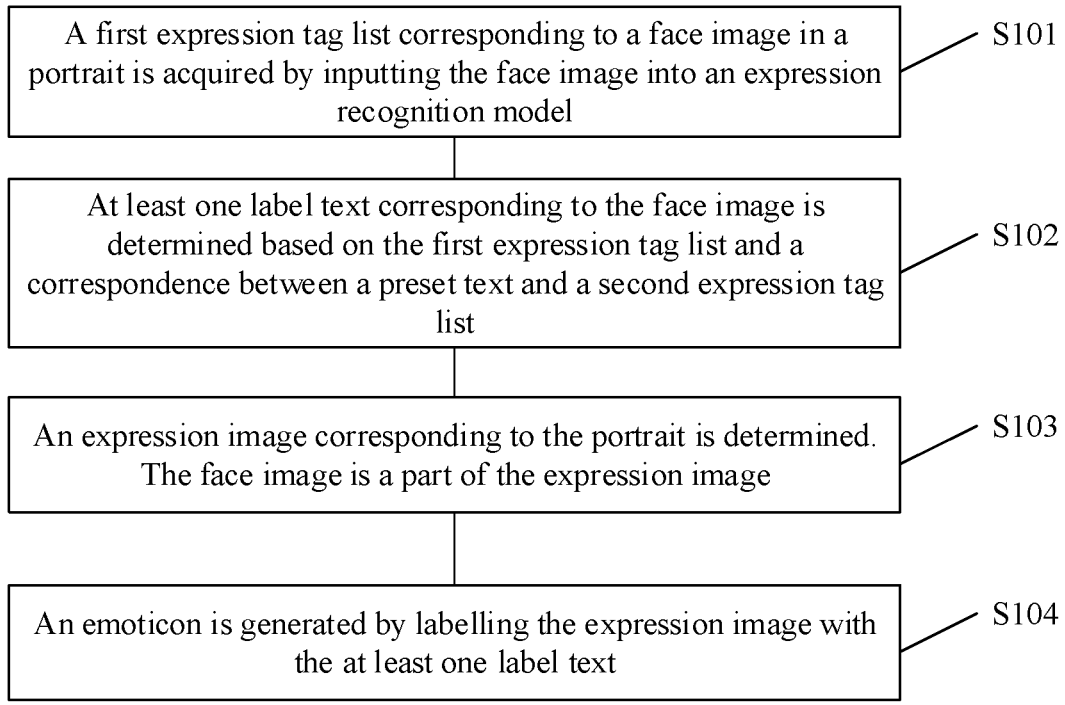
FIG. 1 is a flowchart of a method for generating an emoticon according to embodiments of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the present disclosure. Rather, they are merely examples of the apparatus and method in accordance with certain aspects herein as recited in the accompanying claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "model," "sub-model," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

Emoticon is a common means of social communication, which may vividly convey content to be communicated via an image or a combination of an image and text, implementing better expression of emotion. Types of emoticons used by users in different groups in social communication differ a lot. For example, emoticons used among colleagues, friends, or family members differ significantly in style. However, a manual operation is needed in converting a portrait of a baby into an emoticon among family members, which is of a low degree of automation.

FIG. 1 is a flowchart of a method for generating an emoticon according to embodiments of the present disclosure. As shown in FIG. 1, the method for generating an emoticon is applied to and performed by terminal equipment, and includes steps as follows.

In S101, a first expression tag list corresponding to a face image in a portrait is acquired by inputting the face image into an expression recognition model.

In S102, at least one label text corresponding to the face image is determined based on the first expression tag list and a correspondence between a preset text and a second expression tag list.

In S103, an expression image corresponding to the portrait is determined. The face image is a part of the expression image.

In S104, an emoticon is generated by labelling the expression image with the at least one label text.

In embodiments of the present disclosure, the method for generating an emoticon may be applied to terminal equipment, and is suitable for conveying a content to be communicated in different social scenes. For example, in a scene of social in a circle of friends, an emoticon image of a friend may be used to convey the content to be communicated, to express real emotion. In a scene of social in a group of family members, an emoticon image of a baby may be used to convey the content to be communicated among family members, to enhance the stickiness among family users.

The terminal equipment may be wearable electronic equipment or a mobile terminal. The mobile terminal may include a mobile phone, a notebook computer, or a tablet computer. The wearable electronic equipment may include a smart watch or a smart bracelet, which is not limited by embodiments of the present disclosure.

In S101, the portrait may include an image downloaded from the Internet, a screenshot, or a photo in a photo album in terminal equipment. The face image may be an image of a face in a portrait.

In embodiments of the present disclosure, the portrait may include portraits of people at various ages. Correspondingly, the face image may include face images of portraits of people at various ages in the portraits. For example, the face image may include: a face image of a baby, a face image of a teenager, or a face image of an elderly, which is not limited by embodiments of the present disclosure.

It should be noted that terminal equipment may acquire a plurality of different face images by performing face detection and recognition on the portrait. For example, a plurality of baby face images may be acquired by performing face recognition on a plurality of photos in a photo album. As another example, a plurality of baby face images may be acquired by snapping and performing face recognition on a plurality of images in a video.

The first expression tag list may include at least one expression tag. The expression tag may be configured to indicate the expression expressed by the face image. For example, an expression tag may include, but is not limited to, laughing, crying, hand-sucking, sticking out one's tongue, pouting, frowning, neutral, sleeping, yawning, etc. For example, the first expression tag list L1 may be denoted as: L1={laughing, sticking out one's tongue}, or L1={sleeping, yawning}.

In embodiments of the present disclosure, the terminal equipment stores an expression recognition model. The input of the expression recognition model may be a face image, and the output of the expression recognition model may be at least one expression tag. The at least one expression tag may form the first expression tag list.

The expression recognition model may be formed by training a convolutional neural network using sample expressions, and may be configured to perform expression recognition on a face image. The sample expressions may include, but are not limited to, expressions such as laughing, crying, hand-sucking, sticking out one's tongue, pouting, frowning, neutral, sleeping, yawning, etc.

It is to be noted that one face image may correspond to a plurality of expression tags. For example, the face image is a baby face image, the baby face image may correspond to two expression tags of "laughing" and "sticking out one's tongue". One baby face image may also correspond to two expression tags of "crying" and "frowning".

In S102, the number of expression tags in the second expression tag list may be greater than or equal to the number of expression tags in the first expression tag list. In some embodiments, the second expression tag list may include another expression tag in addition to an expression tag in the first expression tag list. For example, when the first expression tag list includes expression tags "laughing" and "pouting", and the second expression tag list corresponding to the first expression tag list may further include an additional expression tag such as "frowning", "neutral", "sleeping", and "yawning".

In the correspondence between the preset text and the second expression tag list, the second expression tag list may also include at least one expression tag, i.e., one preset text may correspond to one or more expression tags.

Illustratively, the text "feeling real cute" may correspond to a second expression tag list of three expression tags "laughing", "pouting", and "sticking out one's tongue". The text "I just want to sleep" may correspond to a second expression tag list of two expression tags "yawning" and "sleeping".

In embodiments of the present disclosure, the label text may be configured to indicate content conveyed by a facial expression in the face image. The label text may include, but is not limited to, at least one of connotation information, state information, or emotion information of a facial expression.

The emotion information may include at least one of positive emotion information (such as appreciation information) and negative emotion information (such as information on unhappiness, anxiety, etc., corresponding to crying).

The state information may include at least one of daily behavior information and expressed information.

The connotation information may include information on various humor points.

For example, when the facial expression in the face image is a sleeping expression, the label text corresponding to the face image may include state information, and the state information may be "I fall asleep in the morning" or "still sleepy". When the facial expression in the face image is a smiley face, the label text corresponding to the face image may include positive emotion information, and the positive emotion information may be "Thank you, Dad" or "Thank you, Mom", which is not limited in embodiments of the present disclosure.

In embodiments of the present disclosure, a first expression tag list may be acquired by first performing expression recognition on the face image, and then the label text corresponding to the face image may be acquired based on the first expression list label and the correspondence, so that the label text may fit the expression of the face image better, and the label text may also be determined by directly comparing the two expression tag lists, so that the label text is determined more accurately.

In S103, the face image may be a part of the expression image. The size of the expression image may be greater than or equal to the size of the face image.

In embodiments of the present disclosure, in addition to the face in the face image, the expression image further includes a trunk part connecting the face and/or a background part in the portrait, which is not limited by embodiments of the present disclosure.

The expression image corresponding to the portrait may be determined as follows. Cutting may be performed on the periphery taking the face in the portrait as a cutting center, and the cut image may be taken as the expression image. Alternatively, the image frame of the face image may be expanded to acquire an expression frame, and cutting may be performed on the face image based on the expression frame to acquire the expression image.

In S104, the emoticon may be generated by labeling the expression image with the at least one label text as follows. At least one emoticon image may be acquired by labeling the expression image with the at least one label text, and the emoticon may be formed based on the at least one emoticon image.

In embodiments of the present disclosure, in labeling with the label text, the label text may be superimposed on the expression image to generate the emoticon.

The expression image may be labeled with the at least one label text as follows. The expression image may be labeled with one or more label texts selected from the at least one label text. According to embodiments of the present disclosure, one or more label texts may be selected from the at least one label text according to at least one of the frequency of use of the label text, the length of the label text, and the semantics of label text.

In embodiments of the present disclosure, the label text may block the expression image. Therefore, in generating the emoticon, the expression image may be labeled with the label text in a non-face part. The non-face part may include a background part and a trunk part connecting the face. For example, the label text may be placed in the background part of the expression image, or the label text may be placed in the trunk part of the expression image.

Illustratively, an emoticon image in the emoticon may be a static image or a dynamic image, which is not limited by embodiments of the present disclosure.

In embodiments of the present disclosure, the label text corresponding to the face image may be determined, the expression image corresponding to the portrait may be determined, and the expression image may be labeled with at least one of the label text to generate the emoticon. That is, with embodiments of the present disclosure, a label text corresponding to a facial expression may be customized for a face image, acquiring a personalized emoticon. In this way, a personalized emoticon may be generated automatically.

Figure 2:
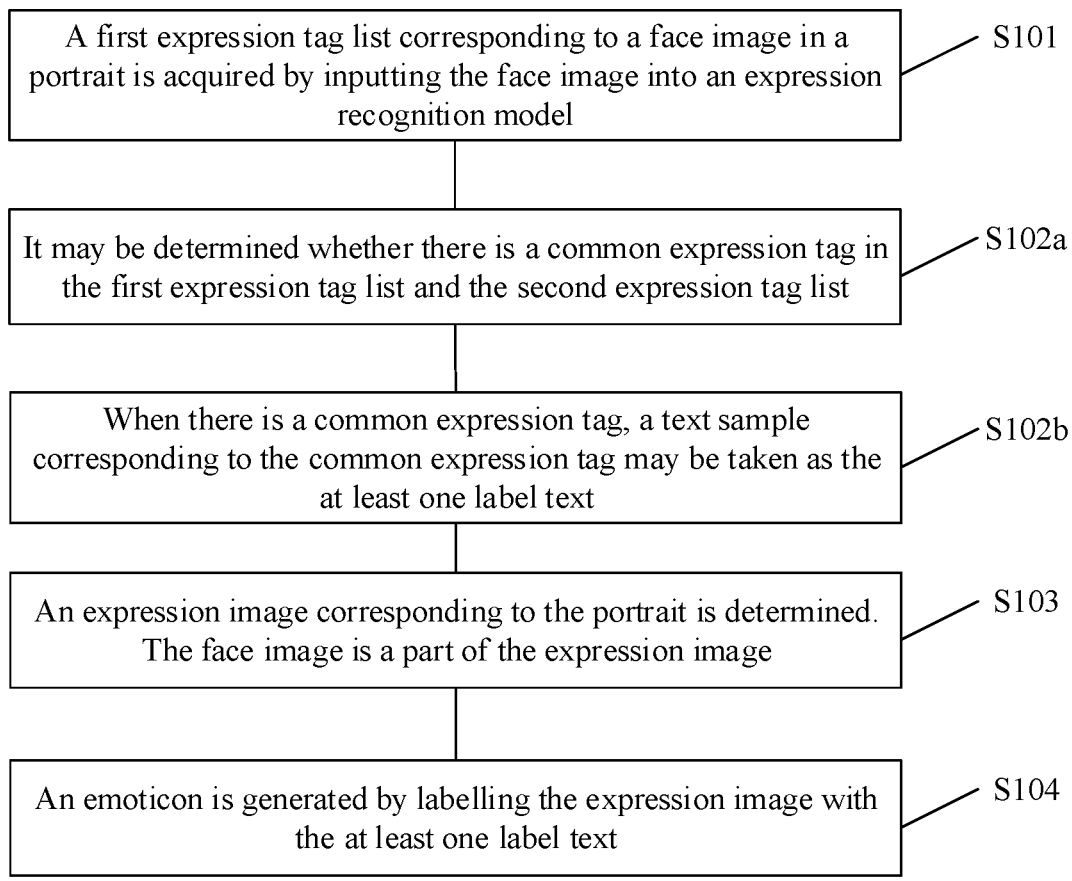
FIG. 2 is a flowchart of a method for generating an emoticon according to embodiments of the present disclosure.

In some embodiments, as shown in FIG. 2, the at least one label text corresponding to the face image may be determined based on the first expression tag list and the correspondence between the preset text and the second expression tag list, as follows.

In S102*a*, it may be determined whether there is a common expression tag in the first expression tag list and the second expression tag list.

In S102*b*, when there is a common expression tag, a text sample corresponding to the common expression tag may be taken as the at least one label text.

In embodiments of the present disclosure, the first expression tag list may contain a plurality of expression tags, and the second expression tag list may contain a plurality of expression tag. It may be determined whether there is a common expression tag in the first expression tag list and the second expression tag list by comparing the first expression tag list and the second expression tag list.

For example, the first expression tag list contains expression tags "laughing", "pouting", and "sticking out one's tongue", and the second expression tag list contains expression tags "laughing" and "sticking out one's tongue". In this case, it may be determined that both the first expression tag list and the second expression tag list have common expression tags "laughing" and "sticking out one's tongue".

In embodiments of the present disclosure, when there is a common expression tag, a text sample corresponding to the common expression tag may be taken as a label text. There may be one or more common expression tags. Correspondingly, there may be one or more text samples. Then, there may be one or more label texts.

In some embodiments, when there are a plurality of common expression tags, all text samples corresponding to the label expressions may be taken as label texts. Alternatively, one or more of the text samples corresponding to the label expressions may be selected as label text. The one or more of the text samples corresponding to the label expressions may be selected as label text based on the weights of the text samples corresponding to the label expressions. For example, a text sample with a greatest weight may be selected as a label sample, or text samples with top three weights may be selected as label samples, which however is not limited thereto.

Illustratively, the common expression tags are "laughing" and "sticking out one's tongue". The text corresponding to "laughing" may be "Thank you, Mom", and the text corresponding to "sticking out one's tongue" may be "feeling real cute". In this case, both the text "Thank you, Mom" and the text "feeling real cute" may be taken as label texts. Alternatively, the weight of the text "Thank you, Mom" may be greater than the weight of the text "feeling real cute". Then, the text "Thank you, Mom" may be selected as the label text.

In some embodiments, one common expression tag may correspond to one or more text samples. When one common expression tag corresponds to multiple text samples, the multiple text samples may be taken as the label text, or one of the text samples may be selected as the label text.

In embodiments of the present disclosure, any expression tag in the first expression tag list may be compared to any expression tag in the second expression tag list. A text sample corresponding to a common expression tag may be taken as a label text. Therefore, label texts corresponding to different facial expressions may be acquired accurately with a common expression tag.

In some embodiments, the text sample corresponding to the common expression tag may be taken as the at least one label text as follows.

When the common expression tag corresponds to a plurality of text samples, a text sample with a greatest weight may be selected as the at least one label text.

In embodiments of the present disclosure, different text samples have different weights. A weight corresponding to a text sample may be determined according to the frequency of use of the text sample and/or as selected by a user operation. The higher the frequency of use of a text sample, the greater the weight of text sample may be set to be. In making an emoticon, a plurality of text samples may be displayed for being selected by a user operation. Then, the weight corresponding to a text sample selected by a user operation may be set to be greater than the weight corresponding to a text sample not selected by the user operation.

For example, a plurality of text samples include "Thank you, Mom" and "feeling real cute", and the weight of the text "Thank you, Mom" is greater than the weight of the text "feeling real cute". Then, the text "Thank you, Mom" may be taken as a label text.

It is noted that by there being a plurality of text samples corresponding to the common expression tag, it may be construed as at least one case as follow. First, there are a plurality of common expression tags, and each of the expression tags corresponds to one or more text samples. Second, there is one common expression tag, and the expression tag corresponds to a plurality of text samples.

In embodiments of the present disclosure, when there are a plurality of sample texts, a text sample with a greatest weight is selected as a label text, allowing the label text to better reflect the content expressed by the face image, improving accuracy in selecting the label text.

In some embodiments, the method further includes an option as follows.

A text set suitable for making an emoticon image may be acquired by performing text classification on each text entry recorded in a text library.

The correspondence between the preset text and the second expression tag list may be acquired by performing expression tag classification on each text sample in the text set.

In embodiments of the present disclosure, the text library may consist of a first text library and a second text library. The first text library may be formed by common phrases in existing emoticon images. The second text library may be formed by buzz phrases or hot words on social media, which is not limited by embodiments of the present disclosure.

Existing emoticon images in social media may be collected by a Web crawler. Optical Character Recognition (OCR) may be performed on each existing emoticon image to extract a text sample, and then the first text library may be formed based on the text sample corresponding to each existing emoticon image. The second text library may be formed by collecting common hot words or buzz phrases in social media by a Web crawler. A text set suitable for making an emoticon image may be acquired by performing text classification on each text entry recorded in a text library, as follows. The text set suitable for making an emoticon image may be selected from the text library through a text classification model or a first preset rule.

It is to be noted that the text classification model may be acquired by training a convolutional neural network using sample texts, and may be configured to classify texts in the text library, acquiring texts suitable for making an emoticon. A sample text may be a text corresponding to an emoticon image in the text library, or a common hot word or buzz phrase in the text library, which is not limited by embodiments of the present disclosure.

In embodiments of the present disclosure, a text set may be acquired using a text classification model by determining the text set through different outputs of the text classification model. For example, when the text classification model outputs 0, it is determined that the input text is not suitable for making an emoticon. When the text classification model outputs 1, it may be determined that the input text is suitable for making an emoticon.

The first preset rule may be set as needed by a user. That is, the text set may be acquired by manually selecting a text in the text library. In embodiments of the present disclosure, texts in the first text library in the text library may be classified using the text classification model, and texts in the second text library in the text library may be classified using the first preset rule. Therefore, different types of text libraries are classified in different classification modes, improving accuracy in classification.

In embodiments of the present disclosure, the correspondence between the preset text and the second expression tag list may be acquired by performing tag classification on each text sample in the text set, as follows. The correspondence between the preset text and the second expression tag list may be determined by classifying the text set through a tag classification model or a second preset rule.

The tag classification model may be acquired by training a convolutional neural network, and may be configured to perform tag classification on texts in the text set to acquire the second expression tag list corresponding to the preset text. The second preset rule may be set as needed by a user. That is, the expression tag corresponding to a text may be selected manually.

In embodiments of the present disclosure, texts in the text set that belong to the first text library may be classified using the tag classification model, and texts in the text set that belong to the second text library may be classified using the second preset rule, which is not limited by embodiments of the present disclosure.

It is to be noted that in classification using a tag classification model, the correspondence between the preset text and the second expression tag list may be determined through different outputs of the tag classification model. For example, the input of the tag classification model may be a text sample, and the output of the tag classification model may be scores corresponding to N expression tags. The correspondence between the preset text and the second expression tag list may be acquired by forming a second expression tag list corresponding to the text sample with at least one expression tag corresponding to a score greater than a score threshold.

Illustratively, the N expression tags include laughing, crying, hand-sucking, sticking out one's tongue, pouting, frowning, neutral, sleeping, and yawning. One text may be classified to correspond to a plurality of expression tags. For example, the text "feeling real cute" may be classified to correspond to three expression tags "laughing", "pouting", and "sticking out one's tongue". The text "I just want to sleep" may be classified to correspond to two expression tags "yawning" and "sleeping".

In embodiments of the present disclosure, the correspondence between the preset text and the second expression tag list is acquired by performing text classification, and then tag classification, on the texts in the text library first. Compared to performing tag classification first and then performing text classification, tag classification does not have to be performed on texts not suitable for making an emoticon, reducing an amount of processing for classification, improving efficiency in classification.

In some embodiments, the method further includes an option as follows.

A new text entry recorded may be acquired.

The correspondence between the preset text and the second expression tag list may be updated based on the new text entry recorded.

In embodiments of the present disclosure, the new text entry recorded includes a commonly used phrase of an emoticon, a buzz phrase, or a hot word currently on social media that differs from those in the text library.

It is to be noted that a commonly used phrase of an emoticon, a buzz phrase, or a hot word on social media may be updated over time. Therefore, with embodiments of the present disclosure, a new text entry recorded may be acquired within a preset time interval. The preset time interval may be set as needed. The preset time interval may be set as a week or a month, which is not limited by embodiments of the present disclosure.

After a new text entry recorded has been acquired, the correspondence between the preset text and the second expression tag list may be updated based on the new text entry recorded, as follows. A new correspondence may be acquired by performing text classification and tag classification on the new text entry recorded, and the correspondence between the preset text and the second expression tag list may be updated with the new correspondence.

In embodiments of the present disclosure, the correspondence between the preset text and the second expression tag list may be updated timely according to update of a commonly used phrase of an emoticon, a buzz phrase, or a hot word in social media, enriching an updated list, acquiring a more accurate label text.

In some embodiments, the emoticon may be generated by labelling the expression image with the at least one label text as follows.

A label location of the at least one label text in the expression image may be determined.

The emoticon may be acquired by arranging the at least one label text based on the label location.

In embodiments of the present disclosure, the expression image includes a face part, a background part, or a trunk part. The label location may be arranged at the background part or the trunk part, which is not limited by embodiments of the present disclosure.

It to be noted that the label location may include a label coordinate of the label text and a label font size of the label text. The size of the label text may be determined through the label font size. For example, the length or the width of the label text may be determined.

In embodiments of the present disclosure, the emoticon may be acquired by arranging the at least one label text based on the label location as follows. The emoticon may be acquired by superimposing the at least one label text on the expression image based on the label coordinate and the label font size.

It is to be noted that with embodiments of the present disclosure, the label location may be determined automatically, and the emoticon may be acquired by arranging the label text based on the label location, rendering emoticon generation smarter.

In some embodiments, the label location may include a label coordinate of the at least one label text and a label font size of the at least one label text.

The label location of the at least one label text in the expression image may be determined as follows.

The label font size may be determined based on a size of the expression image and a length of the at least one label text.

The label coordinate of the at least one label text may be determined according to the size of the expression image, the length of the at least one label text, and the label font size.

In embodiments of the present disclosure, the label font size may be determined based on a size of the expression image and a length of the at least one label text using Formula (1). The zw may indicate the label font size. The wd may indicate the width of the size of the expression image. The len(text) may indicate the length of the label text. The function int( ) may indicate taking an integer. The function min( ) may indicate taking the minimum value.

$$zw = \min\left(\text{int}\left(\frac{wd * 1.0}{len(\text{text})}\right) - 4, \text{int}(0.25 * wd)\right) \quad (1)$$

In embodiments of the present disclosure, the label coordinate of the label text may include a horizontal label coordinate and a vertical label coordinate. The label coordinate of the at least one label text may be determined according to the size of the expression image, the length of the at least one label text, and the label font size using Formula (2) and Formula (3). The zx may indicate the horizontal label coordinate. The zy may indicate the vertical label coordinate. The zw may indicate the label font size.

The wd may indicate the width of the size of the expression image. The ht may indicate the height of the size of the expression image. The len(text) may indicate the length of the label text.

$$zx=0.5*(wd-(len(\text{text})*zw)) \quad (2)$$

$$zy=\min(0.75*ht, ht-zw-4) \quad (3)$$

In embodiments of the present disclosure, the expression image may be labeled with the label text more accurately through the label font size and the label coordinate.

In some embodiments, the expression image corresponding to the portrait may be determined as follows.

An expression frame may be acquired by expanding an image frame of the face image.

The expression image may be acquired by cutting the portrait based on the expression frame.

In embodiments of the present disclosure, an expression frame may be acquired by expanding an image frame of the face image using Formula (4). The Rect1 (x, y, x2, y2) may indicate the image frame. The (x, y) and (x2, y2) may respectively be the horizontal coordinates and the vertical coordinates of coordinates of two vertices of the image frame. The width of the face image may be denoted as w=x2−x. The height of the face image may be denoted as h=y2−y. The r may indicate a face expansion ratio. The Rect2 may indicate the expression frame. The imgw may indicate the width of the portrait.

$$Rect2=(\max(0,x-r*w),\max(0,y-r*w),\min(x2+r*w, imgw),\min(y2,(r+0.5)*w)) \quad (4)$$

The face expansion ratio may be set as needed. For example, the face expansion ratio may be set as 0.3, which is not limited by embodiments of the present disclosure.

In order to facilitate understanding of the embodiments, embodiments of the present disclosure are as follows.

Figure 3:
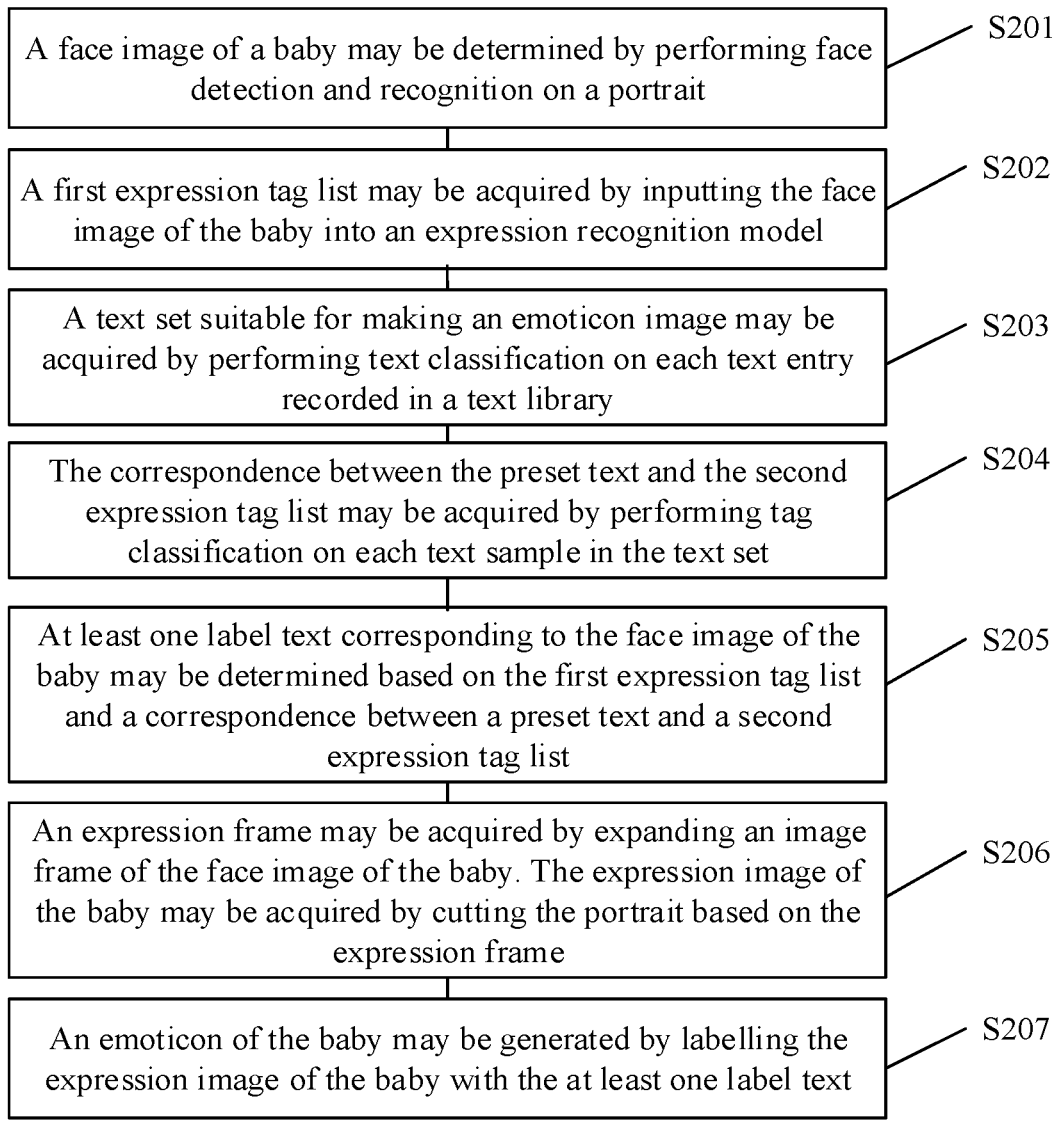
FIG. 3 is a flowchart of a method for generating an emoticon according to embodiments of the present disclosure.

As shown in FIG. 3, for example, a face image is a baby face image, i.e., a face image of a baby. A baby emoticon, i.e., an emoticon of the baby, may be generated correspondingly. A method for generating a baby emoticon according to embodiments of the present disclosure may include a step as follows.

In S201, a face image of a baby may be determined by performing face detection and recognition on a portrait.

In S202, a first expression tag list may be acquired by inputting the face image of the baby into an expression recognition model.

In S203, a text set suitable for making an emoticon image may be acquired by performing text classification on each text entry recorded in a text library.

In S204, the correspondence between the preset text and the second expression tag list may be acquired by performing tag classification on each text sample in the text set.

In S205, at least one label text corresponding to the face image of the baby may be determined based on the first expression tag list and a correspondence between a preset text and a second expression tag list.

In S206, an expression frame may be acquired by expanding an image frame of the face image of the baby. The expression image of the baby may be acquired by cutting the portrait based on the expression frame.

In S207, an emoticon of the baby may be generated by labelling the expression image of the baby with the at least one label text.

According to embodiments of the present disclosure, a baby emoticon may be generated based on a baby expression image and at least one label text corresponding to a baby face image. In this way, a baby emoticon may be generated automatically.

Figure 4:
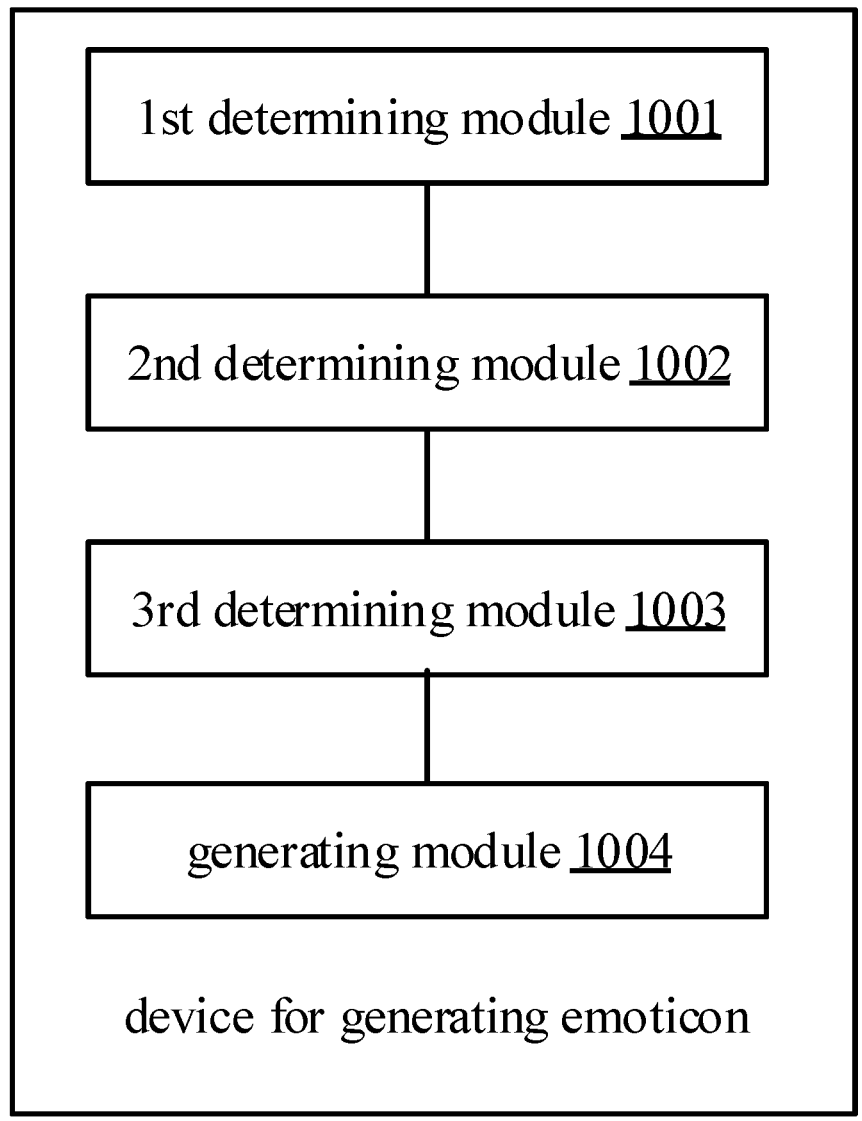
FIG. 4 is a diagram of a device for generating an emoticon according to embodiments of the present disclosure.

FIG. 4 is a diagram of a device for generating an emoticon according to embodiments of the present disclosure. Referring to FIG. 4, the device for generating an emoticon includes a first determining module 1001, a second determining module 1002, a third determining module 1003, and a generating module 1004.

The first determining module 1001 is configured to acquire a first expression tag list corresponding to a face image in a portrait by inputting the face image into an expression recognition model.

The second determining module 1002 is configured to determine at least one label text corresponding to the face image based on the first expression tag list and a correspondence between a preset text and a second expression tag list.

The third determining module 1003 is configured to determine an expression image corresponding to the portrait, wherein the face image is a part of the expression image.

The generating module 1004 is configured to generate an emoticon by labelling the expression image with the at least one label text.

In some embodiments, the second determining module may be further configured to determine whether there is a common expression tag in the first expression tag list and the second expression tag list; and in response to there being the common expression tag, take a text sample corresponding to the common expression tag as the at least one label text.

In some embodiments, the second determining module may be further configured to, in response to the common expression tag corresponding to a plurality of text samples, select a text sample with a greatest weight as the at least one label text.

In some embodiments, the device may further include a fourth determining module and a fifth determining unit.

The fourth determining unit may be configured to acquire a text set suitable for making an emoticon image by performing text classification on each text entry recorded in a text library.

The fifth determining unit may be configured to acquire the correspondence between the preset text and the second expression tag list by performing tag classification on each text sample in the text set.

In some embodiments, the device may further include an acquiring module and an updating module.

The acquiring module may be configured to acquire a new text entry recorded.

The updating module may be configured to update the correspondence between the preset text and the second expression tag list based on the new text entry recorded.

In some embodiments, the generating module may include a sixth determining module and an arranging module.

The sixth determining module may be configured to determine a label location of the at least one label text in the expression image.

The arranging module may be configured to acquire the emoticon by arranging the at least one label text based on the label location.

In some embodiments, the label location may include a label coordinate of the at least one label text and a label font size of the at least one label text.

The sixth determining module may be further configured to determine the label font size based on a size of the expression image and a length of the at least one label text; and determine the label coordinate of the at least one label text according to the size of the expression image, the length of the at least one label text, and the label font size.

In some embodiments, the third determining module may be further configured to acquire an expression frame by expanding an image frame of the face image; and acquire the expression image by cutting the portrait based on the expression frame.

A module of a device according to an aforementioned embodiment may perform an operation in a mode elaborated in an embodiment of a method herein, which will not be repeated here.

Figure 5:
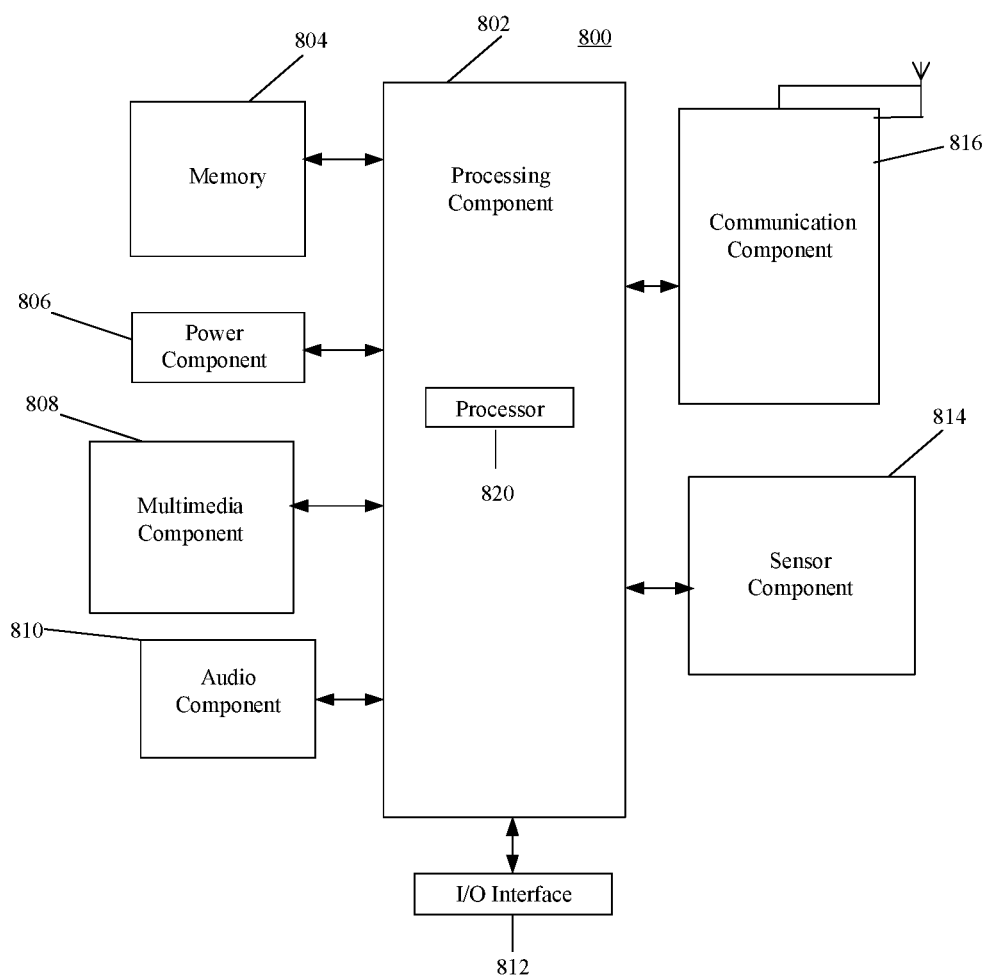
FIG. 5 is a block diagram of a device for generating an emoticon according to embodiments of the present disclosure.

FIG. 5 is a block diagram of a device 800 for generating an emoticon according to embodiments of the present disclosure. For example, the device may be a mobile phone, a mobile computer, a digital broadcasting terminal, a message transceiver, a game console, tablet equipment, medical equipment, fitness equipment, a Personal Digital Assistant (PDA), etc.

Referring to FIG. 5, the device may include one or more components as follows: a processing component 802, a memory 804, a power component 806, a multimedia component 808, an audio component 810, an Input/Output (I/O) interface 812, a sensor component 814, and a communication component 816.

The processing component 802 generally controls an overall operation of the display equipment, such as operations associated with display, a telephone call, data communication, a camera operation, a recording operation, etc. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation on the device. Examples of these data include instructions of any application or method configured to operate on the device, contact data, phonebook data, messages, images, videos, and/etc. The memory 804 may be realized by any type of volatile or non-volatile storage equipment or combination of the volatile or non-volatile storage equipment, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 806 supplies electric power to various components of the device. The power component 806 may include a power management system, one or more power supplies, and other components related to generating, managing and distributing electric power for the device.

The multimedia component 808 includes a screen providing an output interface between the device and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some embodiments, the multimedia component 808 includes a front camera and/or a rear camera. When the device is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 810 is configured to output and/or input an audio signal. For example, the audio component 810 includes a microphone (MIC). When the device is in an operation mode such as a call mode, a recording mode, and a voice recognition mode, the MIC is configured to receive an external audio signal. The received audio signal may be further stored in the memory 804 or may be sent via the communication component 816. In some embodiments, the audio component 810 further includes a loudspeaker configured to output the audio signal.

The I/O interface 812 provides an interface between the processing component 802 and a peripheral interface module. The peripheral interface module may be a keypad, a click wheel, a button, etc. These buttons may include but are not limited to: a homepage button, a volume button, a start button, and a lock button.

The sensor component 814 includes one or more sensors for assessing various states of the device. For example, the sensor component 814 may detect an on/off state of the device and relative location of components such as the display and the keypad of the device. The sensor component 814 may further detect a change in the location of the device or of a component of the device, whether there is contact between the device and a user, the orientation or acceleration/deceleration of the device, and a change in the temperature of the device. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Device (CCD) image sensor used in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless/radio communication between the device and other equipment. The device may access a radio network based on a communication standard such as WiFi, 2G, 3G, . . . , or a combination of the any communication standard. In an illustrative embodiment, the communication component 816 broadcasts related information or receives a broadcast signal from an external broadcast management system via a broadcast channel. In an illustrative embodiment, the communication component 816 further includes a Near Field Communication (NFC) module for short-range communication. For example, the NFC module may be realized based on Radio Frequency Identification (RFID), Infrared Data Association (IrDA), Ultra-WideBand (UWB) technology, BlueTooth (BT) technology, and other technologies.

In an illustrative embodiment, the device may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an illustrative embodiment, a transitory or non-transitory computer-readable storage medium including instructions, such as the memory 804 including instructions, is further provided. The instructions may be executed by the processor 820 of the device to implement an aforementioned method. For example, the computer-readable storage medium may be a Read-Only Memory (ROM), a Random Access Memory (RAM), a Compact Disc Read-Only Memory (CD-ROM), a magnetic tape, a floppy disk, optical data storage equipment, etc.

A transitory or non-transitory computer-readable storage medium has stored instructions which, when executed by a processor, implement a method for generating an emoticon. The method includes:

determining at least one label text corresponding to a face image in a portrait;
 determining an expression image corresponding to the portrait, the face image being a part of the expression image; and
 generating an emoticon by labelling the expression image with the at least one label text.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the embodiments are intended to be illustrative, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited by the appended claims.

According to a first aspect of the present disclosure, there is provided a method for generating an emoticon. The method includes:

acquiring a first expression tag list corresponding to a face image in a portrait by inputting the face image into an expression recognition model;
 determining at least one label text corresponding to the face image based on the first expression tag list and a correspondence between a preset text and a second expression tag list, the at least one label text being configured to indicate content conveyed by a facial expression in the face image;
 determining an expression image corresponding to the portrait, wherein the face image is a part of the expression image; and
 generating an emoticon by labelling the expression image with the at least one label text.

In some embodiments, determining the at least one label text corresponding to the face image based on the first expression tag list and the correspondence between the preset text and the second expression tag list may include:

determining whether there is a common expression tag in the first expression tag list and the second expression tag list; and in response to determining that there is the common expression tag, taking a text sample corresponding to the common expression tag as the at least one label text.

In some embodiments, different text samples have different weights.

Taking the text sample corresponding to the common expression tag as the at least one label text may include: in response to determining that the common expression tag is corresponding to a plurality of text samples, selecting a text sample with a greatest weight as the at least one label text.

In some embodiments, the method may further include:
 acquiring a text set suitable for making an emoticon image by performing text classification on each text entry recorded in a text library; and
 acquiring the correspondence between the preset text and the second expression tag list by performing tag classification on each text sample in the text set.

In some embodiments, the method may further include:
 acquiring a new text entry recorded; and
 updating the correspondence between the preset text and the second expression tag list based on the new text entry recorded.

In some embodiments, generating the emoticon by labelling the expression image with the at least one label text may include:
 determining a label location of the at least one label text in the expression image; and
 acquiring the emoticon by arranging the at least one label text based on the label location.

In some embodiments, the label location may include a label coordinate of the at least one label text and a label font size of the at least one label text.

Determining the label location of the at least one label text in the expression image may include:
 determining the label font size based on a size of the expression image and a length of the at least one label text; and
 determining the label coordinate of the at least one label text according to the size of the expression image, the length of the at least one label text, and the label font size.

In some embodiments, determining the expression image corresponding to the portrait may include:
 acquiring an expression frame by expanding an image frame of the face image; and
 acquiring the expression image by cutting the portrait based on the expression frame.

According to a second aspect of the present disclosure, there is provided a device for generating an emoticon. The device include at least: a processor; and a memory configured to store processor executable instructions.

The processor is configured to implement any method of the first aspect when executing the executable instructions stored in the memory.

According to a third aspect of the present disclosure, there is provided a transitory or non-transitory computer-readable storage medium storing computer-executable instructions which, when executed by a processor, implement any method of the first aspect.

According to a fourth aspect of the present disclosure, there is provided a device for generating an emoticon. The device includes a first determining module, a second determining module, a third determining module, and a generating module.

The first determining module is configured to acquire a first expression tag list corresponding to a face image in a portrait by inputting the face image into an expression recognition model.

The second determining module is configured to determine at least one label text corresponding to the face image based on the first expression tag list and a correspondence between a preset text and a second expression tag list.

The third determining module is configured to determine an expression image corresponding to the portrait, wherein the face image is a part of the expression image.

The generating module is configured to generate an emoticon by labelling the expression image with the at least one label text.

In some embodiments, the second determining module may be further configured to implement: determining whether there is a common expression tag in the first expression tag list and the second expression tag list; and in response to determining that there is the common expression tag, taking a text sample corresponding to the common expression tag as the at least one label text.

In some embodiments, the second determining module may be further configured to, in response to determining that the common expression tag is corresponding to a plurality of text samples, select a text sample with a greatest weight as the at least one label text.

In some embodiments, the device may further include a fourth determining module and a fifth determining unit.

The fourth determining unit may be configured to acquire a text set suitable for making an emoticon image by performing text classification on each text entry recorded in a text library.

The fifth determining unit may be configured to acquire the correspondence between the preset text and the second expression tag list by performing tag classification on each text sample in the text set.

In some embodiments, the device may further include an acquiring module and an updating module.

The acquiring module is configured to acquire a new text entry recorded.

The updating module is configured to update the correspondence between the preset text and the second expression tag list based on the new text entry recorded.

In some embodiments, the generating module may include a sixth determining module and an arranging module.

The sixth determining module is configured to determine a label location of the at least one label text in the expression image.

The arranging module is configured to acquire the emoticon by arranging the at least one label text based on the label location.

In some embodiments, the label location may include a label coordinate of the at least one label text and a label font size of the at least one label text.

The sixth determining module may be further configured to implement: determining the label font size based on a size of the expression image and a length of the at least one label text; and determining the label coordinate of the at least one label text according to the size of the expression image, the length of the at least one label text, and the label font size.

In some embodiments, the third determining module may be further configured to implement: acquiring an expression frame by expanding an image frame of the face image; and acquiring the expression image by cutting the portrait based on the expression frame.

With embodiments of the present disclosure, a label text corresponding to a face image is determined. An expression image corresponding to a portrait is determined. An emoticon is generated by labelling the expression image with at least one label text. That is, with embodiments of the present disclosure, a label text corresponding to a facial expression may be customized for a face image, acquiring a personalized emoticon. In this way, a personalized emoticon may be generated automatically.

What is claimed is:

1. A method for generating an emoticon, comprising:
   acquiring a first expression tag list corresponding to a face image in a portrait by inputting the face image into an expression recognition model;
   determining at least one label text corresponding to the face image based on the first expression tag list and a correspondence between a preset text and a second expression tag list, wherein the at least one label text is configured to indicate content conveyed by a facial expression in the face image;
   determining an expression image corresponding to the portrait, wherein the face image is a part of the expression image; and
   generating an emoticon by labelling the expression image with the at least one label text,
   wherein generating the emoticon by labelling the expression image with the at least one label text comprises:
   determining a label location of the at least one label text in the expression image; and
   acquiring the emoticon by arranging the at least one label text based on the label location,
   wherein the label location comprises a label coordinate of the at least one label text and a label font size of the at least one label text,
   wherein determining the label location of the at least one label text in the expression image comprises:
   determining the label font size based on a size of the expression image and a length of the at least one label text; and
   determining the label coordinate of the at least one label text according to the size of the expression image, the length of the at least one label text, and the label font size.

2. The method of claim 1, wherein determining the at least one label text corresponding to the face image based on the first expression tag list and the correspondence between the preset text and the second expression tag list comprises:
   determining whether there is a common expression tag in the first expression tag list and the second expression tag list; and
   in response to determining that there is the common expression tag, taking a text sample corresponding to the common expression tag as the at least one label text.

3. The method of claim 2, wherein different text samples have different weights, wherein taking the text sample corresponding to the common expression tag as the at least one label text comprises:
   in response to determining that the common expression tag is corresponding to a plurality of text samples, selecting a text sample with a greatest weight as the at least one label text.

4. The method of claim 1, further comprising:
   acquiring a text set suitable for making an emoticon image by performing text classification on each text entry recorded in a text library; and
   acquiring the correspondence between the preset text and the second expression tag list by performing tag classification on each text sample in the text set.

5. The method of claim 1, further comprising:
   acquiring a new text entry recorded; and
   updating the correspondence between the preset text and the second expression tag list based on the new text entry recorded.

6. The method of claim 1, wherein determining the expression image corresponding to the portrait comprises:
   acquiring an expression frame by expanding an image frame of the face image; and acquiring the expression image by cutting the portrait based on the expression frame.

7. A device for generating an emoticon, comprising at least:
a processor; and
a memory configured to store executable instructions executable on the processor,
wherein the processor is configured to execute the executable instructions to implement:
acquiring a first expression tag list corresponding to a face image in a portrait by inputting the face image into an expression recognition model;
determining at least one label text corresponding to the face image based on the first expression tag list and a correspondence between a preset text and a second expression tag list, wherein the at least one label text is configured to indicate content conveyed by a facial expression in the face image;
determining an expression image corresponding to the portrait, wherein the face image is a part of the expression image; and
generating an emoticon by labelling the expression image with the at least one label text,
wherein the processor is further configured to generate the emoticon by labelling the expression image with the at least one label text by:
determining a label location of the at least one label text in the expression image; and
acquiring the emoticon by arranging the at least one label text based on the label location,
wherein the label location comprises a label coordinate of the at least one label text and a label font size of the at least one label text,
wherein the processor is further configured to determine the label location of the at least one label text in the expression image by:
determining the label font size based on a size of the expression image and a length of the at least one label text; and
determining the label coordinate of the at least one label text according to the size of the expression image, the length of the at least one label text, and the label font size.

8. The device of claim 7, wherein the processor is further configured to determine the at least one label text corresponding to the face image based on the first expression tag list and the correspondence between the preset text and the second expression tag list by:
determining whether there is a common expression tag in the first expression tag list and the second expression tag list; and
in response to determining that there is the common expression tag, taking a text sample corresponding to the common expression tag as the at least one label text.

9. The device of claim 8, wherein different text samples have different weights, wherein the processor is further configured to take the text sample corresponding to the common expression tag as the at least one label text by:
in response to determining that the common expression tag is corresponding to a plurality of text samples, selecting a text sample with a greatest weight as the at least one label text.

10. The device of claim 7, wherein the processor is further configured to implement:
acquiring a text set suitable for making an emoticon image by performing text classification on each text entry recorded in a text library; and
acquiring the correspondence between the preset text and the second expression tag list by performing tag classification on each text sample in the text set.

11. The device of claim 7, wherein the processor is further configured to implement:
acquiring a new text entry recorded; and
updating the correspondence between the preset text and the second expression tag list based on the new text entry recorded.

12. The device of claim 7, wherein the processor is further configured to determine the expression image corresponding to the portrait by:
acquiring an expression frame by expanding an image frame of the face image; and
acquiring the expression image by cutting the portrait based on the expression frame.

13. A non-transitory computer-readable storage medium storing computer-executable instructions which, when executed by a processor, cause the processor to perform acts comprising:
acquiring a first expression tag list corresponding to a face image in a portrait by inputting the face image into an expression recognition model;
determining at least one label text corresponding to the face image based on the first expression tag list and a correspondence between a preset text and a second expression tag list, wherein the at least one label text is configured to indicate content conveyed by a facial expression in the face image;
determining an expression image corresponding to the portrait, wherein the face image is a part of the expression image; and
generating an emoticon by labelling the expression image with the at least one label text,
wherein generating the emoticon by labelling the expression image with the at least one label text comprises:
determining a label location of the at least one label text in the expression image; and
acquiring the emoticon by arranging the at least one label text based on the label location,
wherein the label location comprises a label coordinate of the at least one label text and a label font size of the at least one label text,
wherein determining the label location of the at least one label text in the expression image comprises:
determining the label font size based on a size of the expression image and a length of the at least one label text; and
determining the label coordinate of the at least one label text according to the size of the expression image, the length of the at least one label text, and the label font size.

14. The storage medium of claim 13, wherein when executed by the processor, the computer-executable instructions further implement determining the at least one label text corresponding to the face image based on the first expression tag list and the correspondence between the preset text and the second expression tag list by:
determining whether there is a common expression tag in the first expression tag list and the second expression tag list; and
in response to determining that there is the common expression tag, taking a text sample corresponding to the common expression tag as the at least one label text.

15. The storage medium of claim 14, wherein different text samples have different weights, wherein when executed by the processor, the computer-executable instructions further implement taking the text sample corresponding to the common expression tag as the at least one label text by:
  in response to determining that the common expression tag is corresponding to a plurality of text samples, selecting a text sample with a greatest weight as the at least one label text.

16. The storage medium of claim 13, wherein when executed by the processor, the computer-executable instructions further implement:
  acquiring a text set suitable for making an emoticon image by performing text classification on each text entry recorded in a text library; and
  acquiring the correspondence between the preset text and the second expression tag list by performing tag classification on each text sample in the text set.

* * * * *